Oct. 26, 1943.                    M. H. TUFT                       2,332,616
                                  CULTIVATOR
                              Filed July 1, 1940                5 Sheets-Sheet 4

INVENTOR:
MILES H. TUFT
BY
ATTORNEYS.

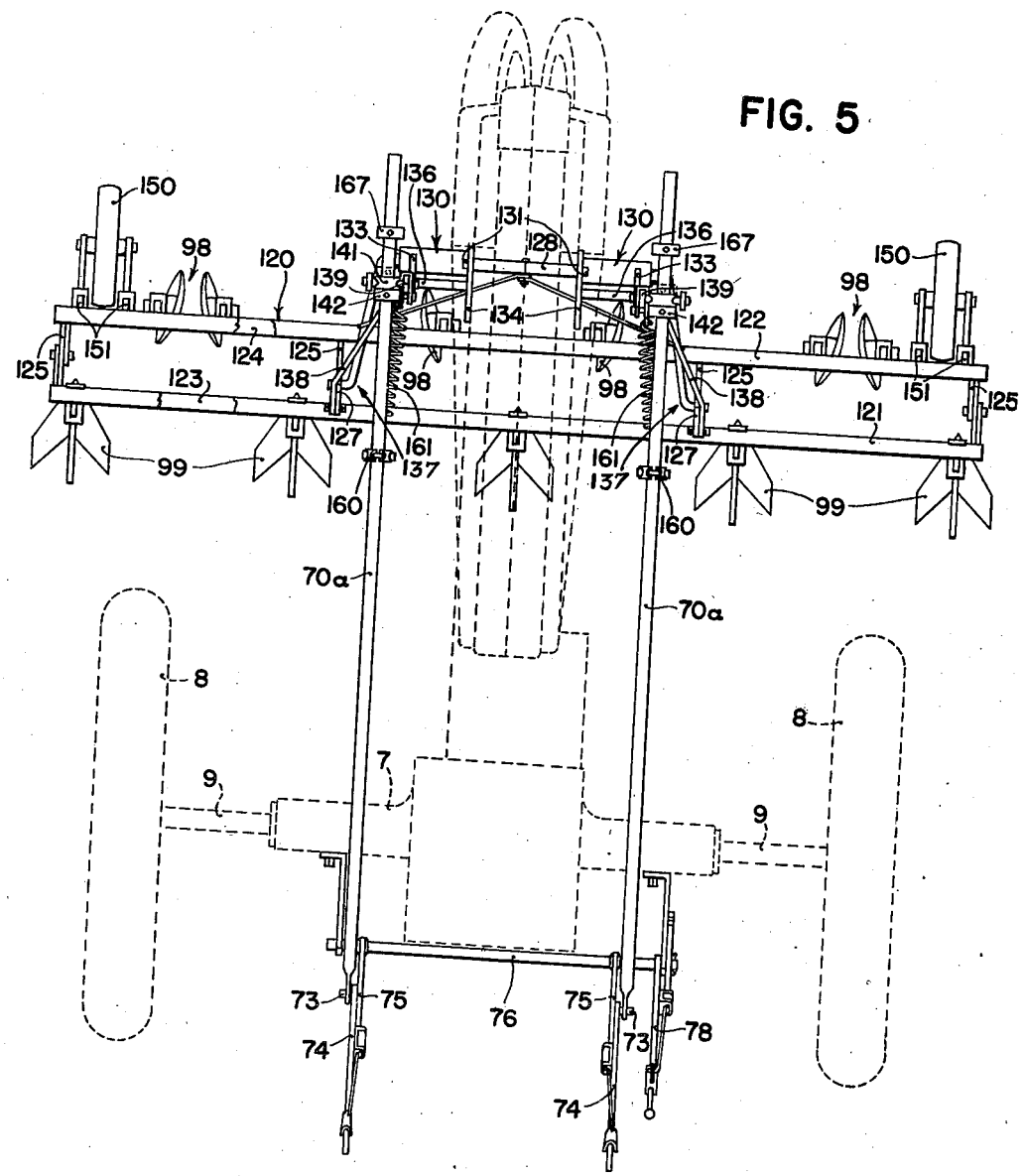

Patented Oct. 26, 1943

2,332,616

UNITED STATES PATENT OFFICE 2,332,616

CULTIVATOR

Miles H. Tuft, Moline, Ill., assignor to Deere & Company, Moline, Ill., a corporation of Illinois Application July 1, 1940, Serial No. 343,354

38 Claims. (Cl. 97—47)

The present invention relates generally to agricultural machines and more particularly to implements for cultivating row crops.

The object and general nature of this invention is the provision of a new and improved cultivator especially constructed for such crops as beets, beans, lettuce and/or other vegetable crops grown either on level land or in beds. One feature of the present invention is the provision of a cultivator of this type which is flexibly mounted on the tractor or other supporting frame means so as to accommodate various irregularities in the ground surface that may be encountered, and more particularly is it a feature of the present invention to provide improved lifting connections accommodating such flexible mounting.

A further feature of this invention is the provision of adjustable lifting connections which can be arranged to permit the tools to operate at an angle, whereby the implement may be employed for cultivating row crops on inclined beds. Still further, another feature of this invention is the provision of lifting connections which may be adjusted so as to raise the outer ends of the tool frames higher than the inner ends, or the tool frames may be raised to the same height, depending upon the adjustment. In this connection it is a further feature of the invention to provide reversible tool frames which may optionally be arranged in two different positions, one in which the laterally inner ends of the tool frames are disposed close together and underneath the tractor, in which case the lifting connections should be arranged so that the outer ends of the tool frames are raised higher than the inner ends, thereby preventing the latter from striking the under surface of the tractor, or the tool frames may be reversed so that the inner ends clear the tractor, in which case the lifting connections may be arranged to raise the tool frames evenly. The latter arrangement is particularly adapted to accommodate the cultivation of crops planted on beds, with the tractor wheels running in the furrows between the beds. An implement of this kind is termed a high clearance cultivator, inasmuch as the tools are necessarily lifted to an appreciably higher position when they are raised out of their working position. To accommodate such high clearance arrangement, the tool frames should be arranged so that their inner ends clear, or are spaced laterally outwardly of, the sides of the tractor. The flexible lifting connections of the present invention are admirably adapted to accommodate arrangement of the tool frames for either of these operations.

Another feature of the present invention is the provision of improved lifting connections, wherein spring means is provided for yieldingly urging the tools downwardly into their ground engaging position, the spring means being arranged so that they serve also to aid in lifting the tools into their transport or non-working position.

These and other objects and advantages of this invention will be apparent to those skilled in the art after a consideration of the following detailed description of the preferred structure shown in the accompanying drawings and described below.

In the drawings:

Figure 5 is a modified form of the present invention, in which the cultivator tool frame is a single unit and is provided with gauge wheels and a form of lifting means which incorporates a spring serving both to aid in raising the tool frames and in holding them down in their working position;

Figure 6 is an enlarged side view of the lifting connections shown in Figure 5.

Figure 1:
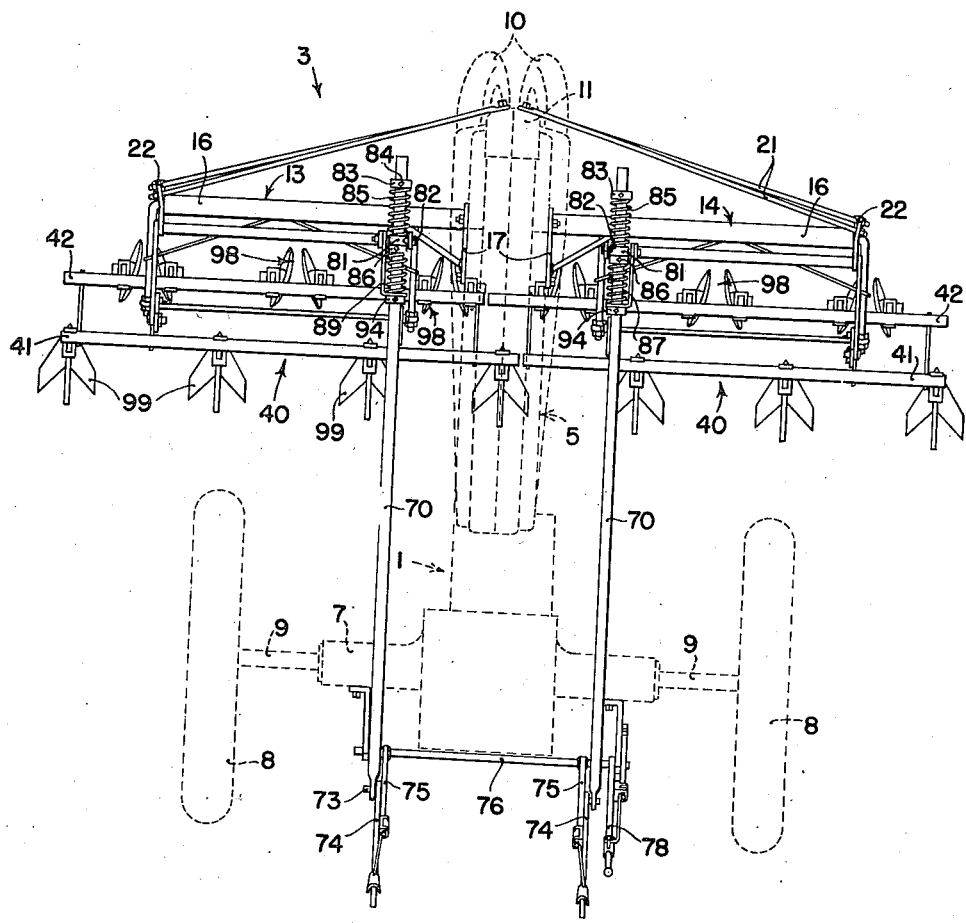
Figure 1 is a plan view of a tractor mounted cultivator in which the present invention has been incorporated.
Figure 2:
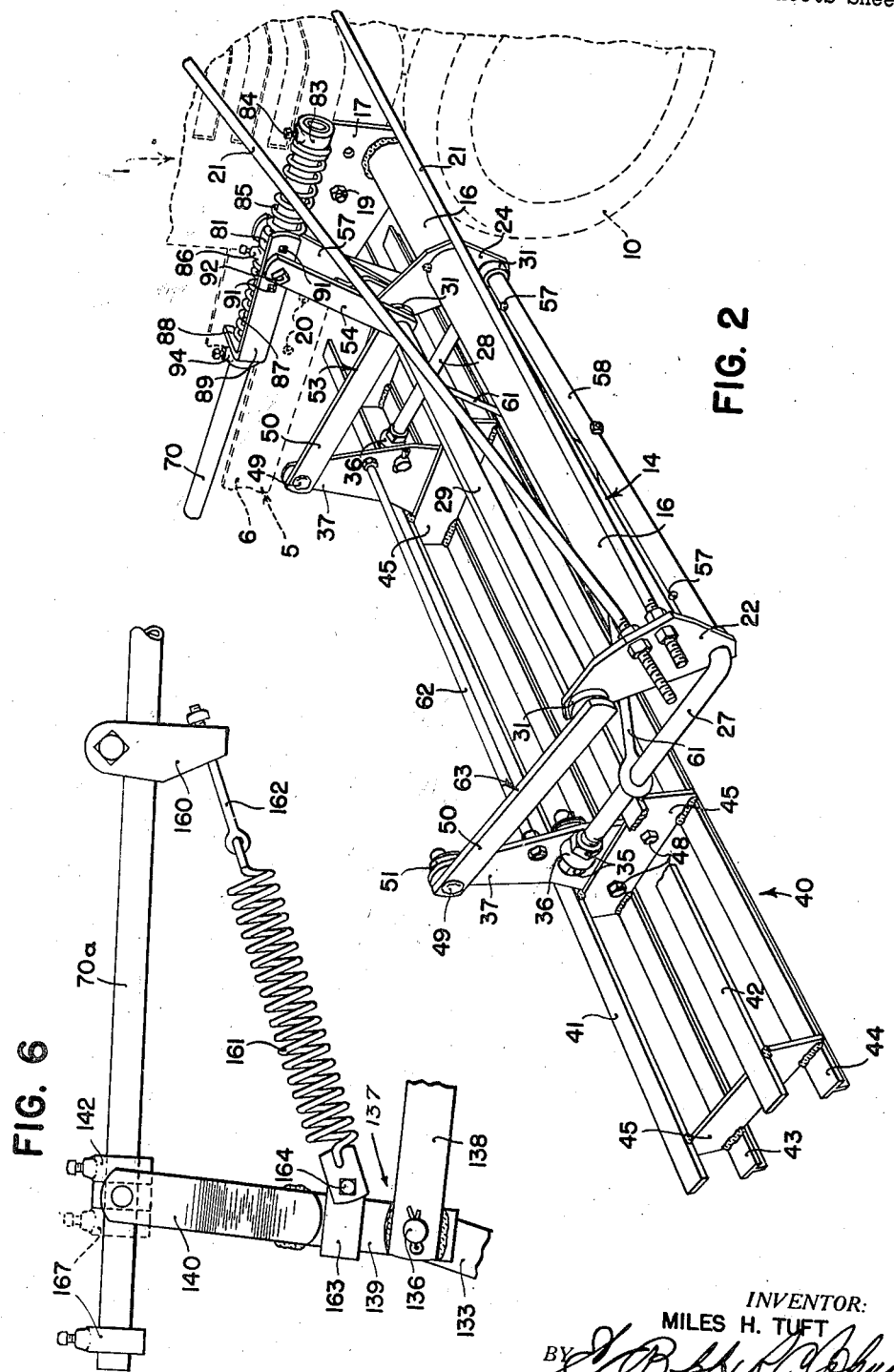
Figure 2 is a perspective view of the right half of the implement shown in Figure 1.

Referring now more particularly to Figures 1 and 2, the reference numeral 1 indicates a farm tractor of conventional construction, which constitutes the supporting frame means for an implement that is indicated in its entirety by the reference numeral 3. As shown in these figures, the implement 3 is a tractor-mounted cultivator especially arranged for vegetable crops planted in rows. The tractor 1 comprises the usual frame 5, which includes side bars 6, a rear axle 7, a pair of rear wheels 8 carrying axle shafts 9, and front wheels 10 mounted for steering movement in the front pedestal 11 of the tractor.

The implement 3, which is in the form of a cultivator attachment, includes two laterally outwardly extending draft members 13 and 14 which serve as a supporting means for the ground working tools and which preferably are in the form of pipes 16 having attaching plates 17 at their inner ends. The attaching plates 17 are apertured to receive bolts 19 which pass through suitable apertures 20 in the tractor side bars 6, whereby the draft beams 13 and 14 are firmly connected to the tractor. One or more sets of openings 20 are provided to accommodate different positions of the draft beams 13 and 14 on the tractor. Each of the draft members 13 and 14 is reenforced by a pair of brace rods 21 fastened at their inner ends to studs on the tractor pedestal 11 and at their outer ends to a bracket 22 toward which the rods 21 converge. This particular tool supporting means is disclosed in more detail and is claimed in U. S. Patent 2,239,387, issued April 22, 1941, to Theodore W. Johnson. A second bracket 24, similar to the bracket 22 except that no provision is made to receive brace bars, is fixed to each draft beam adjacent the inner end thereof.

The two brackets 22 and 24 are spaced apart laterally on the associated draft member and, as best shown in Figure 2, each bracket extends below the associated draft beam and is apertured to receive the laterally inturned ends of a pair of links 27 and 28, and the brackets 22 and 24 are extended upwardly and are apertured to receive a shaft 29. To provide adequate bearing for the parts 27, 28 and 29, the upper and lower portion of each of the brackets 22 and 24 has collars or bushings 31 welded or otherwise permanently fixed to the brackets 22 and 24, thereby serving in effect to provide a wider bearing for these parts.

Figure 4:
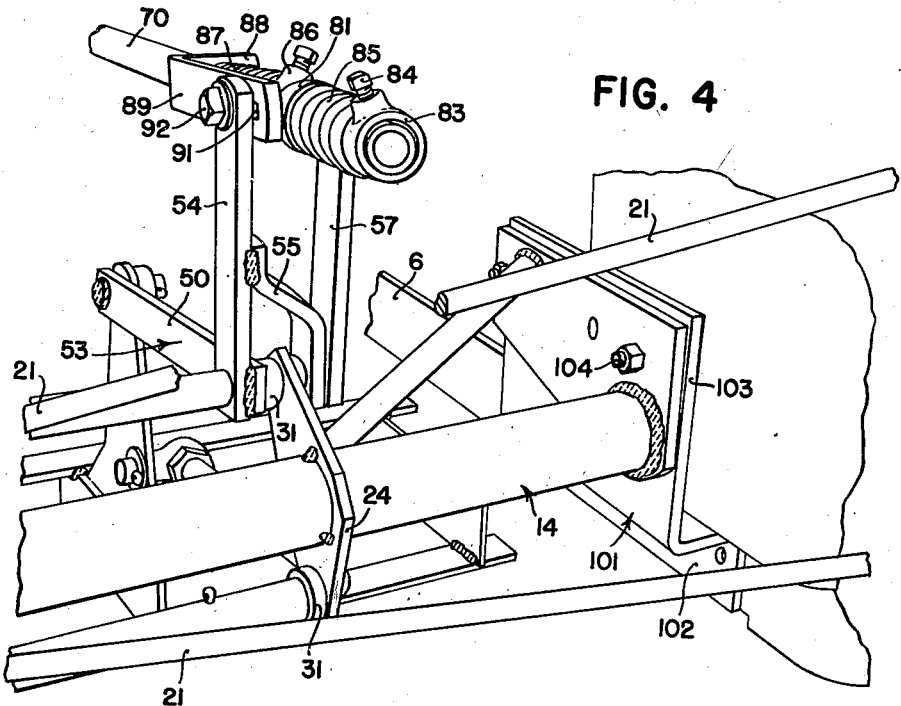
Figure 4 is a perspective view, similar to Figure 2, but showing the parts arranged to provide a high clearance cultivator, as in Figure 3.

The rear ends of the links 27 and 28 are threaded and each receives a pair of nuts 35 which are disposed on opposite sides of an eye bolt 36 pivoted in the lower portion of a lift bracket 37 which forms a part of a tool frame indicated in its entirety by the reference numeral 40. The latter is made up of a pair of flat bars 41 and 42 and a pair of T-bars 43 and 44 connected together by suitable cross braces or plates 45. The lift brackets 37 are fixed in any suitable manner, as by bolts 48, to the intermediate cross bars, as best shown in Figure 2. As shown in Figure 1, there is a tool frame 40 at each side of the tractor 1. The lift brackets 37 extend generally upwardly and are apertured at their upper ends to receive pivots 49 by which a pair of lift arms 50 are operatively connected with the tool frame 40. The upper end of each of the lift brackets 37 is provided with a bushing 51 similar to or identical with the bushings 31 described above, by virtue of which the pivots 49 have adequate bearing support in the lift brackets 37. The outer lifting arm 50 of each pair is fixed, as by welding or the like, to the laterally outer end of the associated rock shaft 29, and the laterally inner lift arm 50 is mounted for rocking movement on the inner end of the rock shaft 29 and preferably forms a part of a bell crank lever which is indicated in its entirety by the reference numeral 53. As best shown in Figure 4, the bell crank 53 consists of the arm 50 which extends rearwardly and another arm 54 which extends generally upwardly, the two arms 53 and 54 being securely connected together, as by welding or the like. A bracket 55 is welded or otherwise secured to and forms a part of the arm 50, the lower end of the bracket 55, as best shown in Figure 4, being disposed on the inner side of the inner draft bracket 24. Secured to the innermost end of the rock shaft 29 is a second arm 57 which extends generally upwardly alongside the bell crank arm 54. As will be readily seen, the two interconnected arms 50 and 54, constituting the bell crank lever 53, and the laterally outer lifting arm 50 together with the laterally inner and upwardly extending arm 57, which are connected together by the rock shaft 29, constitutes two lifting members which are supported for pivotal movement on the associated laterally outwardly extending draft member and are connected to raise and lower the tool frame 40. The arms 50 at each side of the tractor are disposed generally in parallelism with the associated lower arms or links 27 and 28 whereby the tool frame 40 is maintained generally parallel to the ground in any operating or transport position. As best shown in Figure 2, the pivots 49 are somewhat longer than the associated bearing portions 51 and the thickness of the upper ends of the lift brackets 37. Likewise, the shaft 29 is formed so that the forward ends of the arms 50 are spaced laterally outwardly and laterally inwardly, respectively, of the supporting portions at the upper ends of the laterally outer and laterally inner draft brackets 22 and 24. This provides a limited amount of lateral looseness in the joints whereby either end of either frame 40 may be raised or lowered relative to the other end, it being remembered that the inner lifting member 53 and the outer lifting member 63 are movable one relative to the other, since the parts 50 and 54 are mounted for rocking movement on the shaft 29, which forms a part of the lifting member 63. Similarly, there is sufficient looseness at the eye bolts 36, where they pass through and connect with the lift brackets 37, and at the forward pivotal support of the links 27 and 28 at the lower ends of the draft brackets 22 and 24 to accommodate the aforesaid tilting action of the tool frames 40. Referring to the lower links 27 and 28, the laterally directed ends of these parts are received within and pinned, as by cotter keys 57, to a tubular member 58 which is constructed and arranged in generally the same manner as disclosed in my prior Patent No. 2,150,665, dated September 2, 1936. The links 27 and 28 are reenforced by braces 61. A tie-bar 62 extends between the lift brackets 37 and reenforces the latter.

Reference was made above to the fact that the interconnected arms 50 and 54 constituted an inner bell crank or lifting member 53 which is movable relative to the laterally outer lifting arm 50, which together with its associated shaft 29 and arm 57, constitutes a lifting bell crank or a lifting member which has been indicated in its entirety by the reference numeral 63. Therefore, by actuating one or the other of these lifting members 53 or 63, one or the other of the ends of the transversely disposed tool frame 40 may be raised or lowered. According to the present invention lifting means at each side of the tractor is connected with the lifting members 53 and 63 so as to raise the associated tool frame 40 into the position desired, and associated with such lifting means is spring-biased or yielding means reacting against the lifting means for resiliently holding the tool frame 40, together with the tools thereof, down in an operating position. Such lifting connections will now be described.

At each side of the tractor a longitudinally shiftable lift pipe 70 is mounted for generally fore and aft movement. In one form of the present invention the rear end of the left-hand lift pipe (Figure 1) is pivotally connected at 73 to a hand lever 74, which is pivoted to a sector 75 that is, in turn, fixed to a transverse rock shaft 76 carried at the rear of the tractor. Suitable latch mechanism on the hand lever 74 serves to fix the latter to the rock shaft 76. The right-hand lift pipe 70 is also pivotally connected to a hand lever pivoted to a sector carried by the right-hand end of the rock shaft 76, and since these parts are identical with those just described, the same reference numerals have been employed in Figure 1. A master lever 78 is fixed to the rock shaft 76, preferably at the right-hand end thereof, and by operating the master lever 78, both lift pipes 70 may be shifted in a longitudinal direction. Each lift pipe 70 is connected with the associated tool frame and lifting members 53 and 63 in substantially the same manner, and hence a description of one set of lifting connections will suffice.

Referring now more particularly to Figure 2, the forward end of the right-hand lift pipe 70 extends between the two arms 54 and 57. A collar 81 encircles the lift pipe 70 and is pivoted, as at 82, to the upper end of the laterally inner arm 57, which forms a part of the lifting member 63 connected with the laterally outer end portion of the right-hand tool frame 40. An adjustable collar 83 is fixed, as by a set screw 84, to the forward end of the lift pipe 70, and a compression spring 85 is mounted on the forward end of the lift pipe 70 between the collars 81 and 83. A second adjustable collar 86 is disposed on the lift pipe 70 in back of the collar 81 and receives the forward end of a compression spring 87, the rear end of which bears against the laterally inturned end 88 of a link 89 which extends forwardly alongside the spring 87 and is provided with a plurality of holes 91. A pivot bolt 92 is disposed in any one of the holes 91 and serves to pivotally connect the upper end of the arm 54 with the link 89. An adjustable collar 94 is disposed about the lift pipe 70 back of the laterally turned end 88. Suitable set screws are carried by the collars 86 and 94, these collars being similar to or identical with the forward collar 83 having the set screw 84. The lifting connections at the left side of the tractor are of the same construction and hence the same reference numerals have been employed (Figure 1).

As mentioned above, the two tool frames 40 are preferably supported in transverse alignment, as best shown in Figure 1, the two sections being separately controlled, each serving as an independent unit readily conforming to uneven ground. Each tool frame is arranged to receive suitable tools, which may vary according to the crops raised, soil conditions, and other factors and which are laterally adjustable along the frame bars 41 to 44. Figure 1 illustrates a six-row machine, three pairs of disk weeders 98 being fixed by suitable shanks and clamps to the forward frame bars 42 and 44 and four shovels 99 are fixed to the rear frame bars 41 and 43 of the left hand tool frame and three shovels are fixed to the rear frame bars of the right hand tool frame.

The operation of the cultivator as so far described, is substantially as follows:

The outfit is driven down the rows with the disk weeders of each pair disposed on opposite sides of the row of plants and with the shovels or other tools 99 disposed between the rows. The tractor 1 is of the tricycle type, and the front wheels 10 operate in the space between the two center rows being cultivated while the rear wheels 8 run in the space between the outermost row of plants and the row next to it. The use of the tricycle type of tractor affords important advantages in the cultivation of vegetables, such as beets, beans and the like, inasmuch as the operator has an excellent view of the rows being cultivated and the outfit is exceptionally stable, due to the relatively wide spacing of the rear wheels. When the operator desires to lower the tools 98 and 99 into operating position, he pulls back on the master lever 78. This rocks the rock shaft 76 and shifts the lift pipes 70 rearwardly. Such rear movement not only permits the tool frames 40 to lower but, when the tools 98 and 99 engage the ground, the further rearward movement of the lifting pipes 70 causes the collars 83 and 86 at each side of the tractor to bear against the associated springs 85 and 87, compressing the latter. The force thus imparted to the springs 85 and 87 at each side of the tractor acts against the collar 81, which is pivoted to the upper end of the arm 57, and against the laterally inturned end 88 of the link 89, which is pivoted to the other arm 54. The springs 85 and 87, thus compressed, tend to swing the lifting bell crank levers 53 and 63 in a direction to force the ends of the tool frame 40 associated therewith downwardly. It will be noted that each spring acts against the associated end of the tool frame independently of the other spring. This permits each tool frame to follow irregularities in the ground surface while maintaining adequate pressure against the tool frame to keep the tools operating at the desired depth. The master lever 78 may be locked at any point, and the position determines the maximum depth to which the tool frames 40 may be lowered. That is to say, the springs 85 and 87 at each side of the tractor act against the associated tool frames to cause them to lower, but when the collar 81 engages the collar 86, the spring 85 is not effective to cause the inner end of the associated tool frame to lower any farther, likewise when the lower end of the link 89 is moved by the spring 87 against the collar 94, then the laterally outer end of the frame 40 cannot be moved downwardly any further. The collar 81 is slidable on the forward end of the associated lift pipe 70, and likewise the rear end of the link 89 is slidable on the associated lift pipe 70. Preferably, the end 88 is provided with a slot to permit the link 89 to be readily applied to the pipe 70 associated therewith, without having to thread the same on the lift pipe 70 over the front or rear end thereof.

As will be readily understood, the collars 81, 83 and 94, together with the link 89, may be arranged in several different positions. As shown in Figure 1, the collars 86 and 94 are arranged so that when the tools are in their operating position the springs 85 and 87 hold the collar 81 and the link 89 back against the lift pipe collars 86 and 94, and since the master lever is normally latched in an operating position, the corresponding position of the lift pipe 70 determines the maximum operating depth of the tools. However, if they should encounter an obstruction, the frame may yield upwardly, at one end or the other, independently, or at both ends, since one or the other or both of the lifting bell cranks 53 and 63 may be swung forwardly against the tension of the associated springs 85 and 87. If desired, however, the parts may be arranged so that the tool floats, rather than being limited in its downward movement. First, the master lever may be pulled back to a deeper position, in which case the tools might operate in a position where the springs 85 and 87 continually exert a force tending to cause the tools to move deeper, in which case the collar 81 would not be in contact with the collar 86, nor would the rear end of the link 89 be in contact with the collar 94. If it is desired to operate the tools under this condition but without excessive compression in the springs 85 and 87, then the collar 83 is moved forwardly the desired amount, and the collar 94 is moved rearwardly, the link 89 being shifted to a rear position by removing the pivot bolt 92 and placing the same in the forward hole 91. This permits the tool frame to float but without excessive compression in the springs 85 and 87. On the other hand, if it is desired to increase the compression of the springs 85 and 87, either when the tool frame floats or when the same is held against downward movement by engagement with the lift pipe 70, the collar 83 may be moved to a rear position on the pipe, the link 89 may be moved forwardly by engaging the pivot bolt 92 in the rear hole 91, and the rear collar 94 may be moved to a more forward position.

It will thus be observed that the cultivator I have provided is very flexible, not only in operation but also in the manner of its adjustments. In other words, not only may the tension of the springs 85 and 87 be adjusted but also the operative connection between the lift pipe 70 and the lifting bell cranks 53 and 63 may be adjusted to secure exactly the action desired.

In addition to the permissive adjustments which may be made in the lifting connections of the present invention as described above, it may be desirable at times to cause the outer end of each tool frame to be raised higher than the inner end. Ordinarily, the tool frames are raised by swinging the master lever forwardly, which pushes the lift pipes 70 forwardly and causes the collar 86 to bear against the collar 81 and the collar 94 to bear against the rear end of the link 89. Since the collar 81 and the link 89 are connected, respectively, with the lifting bell cranks 63 and 53, it will be seen that forward movement of each lift pipe 70 will swing the rear ends of the arms 50 upwardly, raising the associated tool frame. If it should be desired, for example, to cause the outer end of each tool frame to be raised higher than the inner end, as when transporting the machine, all that the operator has to do is to adjust the collars so that the collar 94 engages the rear end of the link 89 after the collar 86 engages the collar 81. Since the latter mentioned engagement takes place first, when the lift pipe 70 is forced forwardly, the outer arm 50 will be swung upwardly before the inner arm 50, therefore the outer end will be raised higher. In the construction shown in Figure 1, the collar 86 has two functions. First, it determines the amount of compression in the spring 87, and also it transfers the lifting effort from the pipe 70 to the inner arm 57 which carries the collar 81 slidable on the pipe 70. If it is desirable, however, two collars may be provided in lieu of the single collar 86 shown, whereby the tension in the spring 87 may be adjusted without varying the point at which the lift pipe 70 starts to raise the outer end of the associated tool frame, likewise the point at which the outer end of the frame is raised can be adjusted without varying the compression in the spring 87. However, as shown, the link 89 and the rear collar 94 may ordinarily be adjusted to take care of any variation which change in the position of the collar 86 may cause.

Mention was made above of the possibility that the farmer may desire to raise the outer ends of the tool frames 40 higher than the inner ends under certain conditions. For example, it may be desirable to arrange the parts in this manner where the tool frames extend laterally outwardly beyond the rear wheels, and hence might tend to dig into the ground should the tractor be driven over rough terrain. That is to say, if the tool frames extend laterally outwardly beyond the rear wheels a distance about the same as the distance from the center of the tractor to the rear wheels, then a displacement generally vertically of one inch at the rear wheel will cause a displacement of two inches at the outer end of the associated tool frame. Therefore, a high lift would be desirable in order to prevent damage to the outer tools. However, it is also desirable to secure adequate cultivation at points behind the front wheels for the plant rows adjacent to the path of movement of the front wheels. To take care of this situation it is common to have the tool frames 40 extend underneath the tractor and supported quite close to one another, that being the arrangement shown in Figure 1. From this figure it will be noted that there is about a space of one-inch, more or less, between the aligned frame bars. In fact, the tool frames 40 have been arranged so that parts actually overlap, this being the arrangement shown in my prior patent mentioned above, which has the advantage that a set of tools 98, 99 may be disposed directly rearwardly of the front wheels 10. Thus, where the tool frames extend to points underneath the tractor, as shown in Figure 1, the tool frames cannot be raised as high at their inner ends as at their outer ends, and as a matter of fact, a high lift at the inner ends of the tool frames, which are directly behind the front wheels, is not necessary to secure adequate lift at the outer ends, especially where the tool frames extend laterally outwardly beyond the rear wheels. The lifting connections of the present invention are therefore admirably adapted to permit the use of tool frames which extend underneath the tractor but which may be adapted so that the laterally outer ends may be raised higher than the laterally inner ends, which underlie the tractor. This may be accomplished, as mentioned above, by arranging the collars so that the collar 86 engages the associated bell crank lever 63 before the collar 94 engages the link 89. In an arrangement of this kind it is preferable that the tool frames float, in which case the springs 85 and 87 are arranged to apply equal pressure against the inner and outer ends of the tool frames when they are in operating position.

On the other hand, there are operating conditions in which it may be desired to have the springs apply equal pressure to the inner and outer ends of the associated tool frames but with the latter operating at an angle, that is, with one end, either the laterally inner end or the laterally outer end, higher than the other end. Conditions of this kind are encountered in sections of the country where the crop is planted on inclined beds, the beds being inclined in order to secure more sunlight and mature earlier. In a situation of this kind, it would therefore be desirable to operate the tractor level but with the two tool frames tilted laterally. As will be readily understood, this condition may be accommodated by suitable adjustments of the lifting connections whereby the inner and outer ends of the tool frame may be raised the same amount and may receive equal pressure from the springs 85 and 87, but with one end higher than the other. For example, if it should be desired to operate in this manner with the laterally outer end of the right-hand tool frame 40 higher than the laterally inner end, then the collars 83 and 86 are shifted forwardly substantially the same amount, thereby not changing the compression in the spring 85 but raising the outer end relative to the inner end, the link 89 being adjusted forwardly, as by placing the pivot bolt 92 in the rear hole 91, so that the compression in the spring 87 is not varied, and then adjusting the rear collar 94 forwardly to correspond. When arranged in this manner, the springs 85 and 87 apply substantially the same pressure through the lifting bell cranks 53 and 63 against the laterally inner and outer ends of the tool frame, yet the latter is carried in a tilted or angled position. Also, when the lift pipe 70 is moved forwardly, the inner and outer ends of the tool frame are lifted through substantially the same extent. In case two collars are employed in lieu of the single collar 86 shown in Figures 1 and 2, the forward one of these two collars may be adjusted to follow the forward position of the collar 81, in which case the outer end of the tool frame may be carried higher than the inner end but without requiring any adjustment of the link 89 or the collar 94. When the outer end of the right-hand tool frame 40 is carried higher than the inner end, under the conditions assumed, the inner end of the left-hand frame should be carried higher than the outer end, and the lifting connections at the left side of the tractor may be arranged to accommodate such position by adjusting the collars 86 and 94 and associated parts so that the collar 86 will engage the collar 81 and swing the laterally inner bell crank 53 before the other lifting bell crank 63 is actuated.

It is possible that the desired tilted or angled position of the tool frames may be greater than would be practical where the laterally inner ends of the tool frames 40 are disposed underneath the tractor 1, as shown in Figure 1. There are other conditions also, such as cultivating crops which are planted on relatively high beds, where it is not desirable to have the laterally inner ends of the tool frames extend underneath the tractor since the inner ends of the tool frames might strike the undersurface of the tractor when raising the tool frames into their lifted or transport position. To accommodate an arrangement wherein the tool frames are permitted to be raised to a position higher than what can be conveniently accommodated when the inner ends of the tool frames are disposed underneath the tractor, the present invention contemplates means making it possible to reverse the tool frames 40 so that without changing the position of the lifting bell crank levers, the tool frames can be arranged so that their laterally inner ends clear the sides of the tractor, and therefore the tool frames may be raised to provide the desired high clearance.

Figure 3:
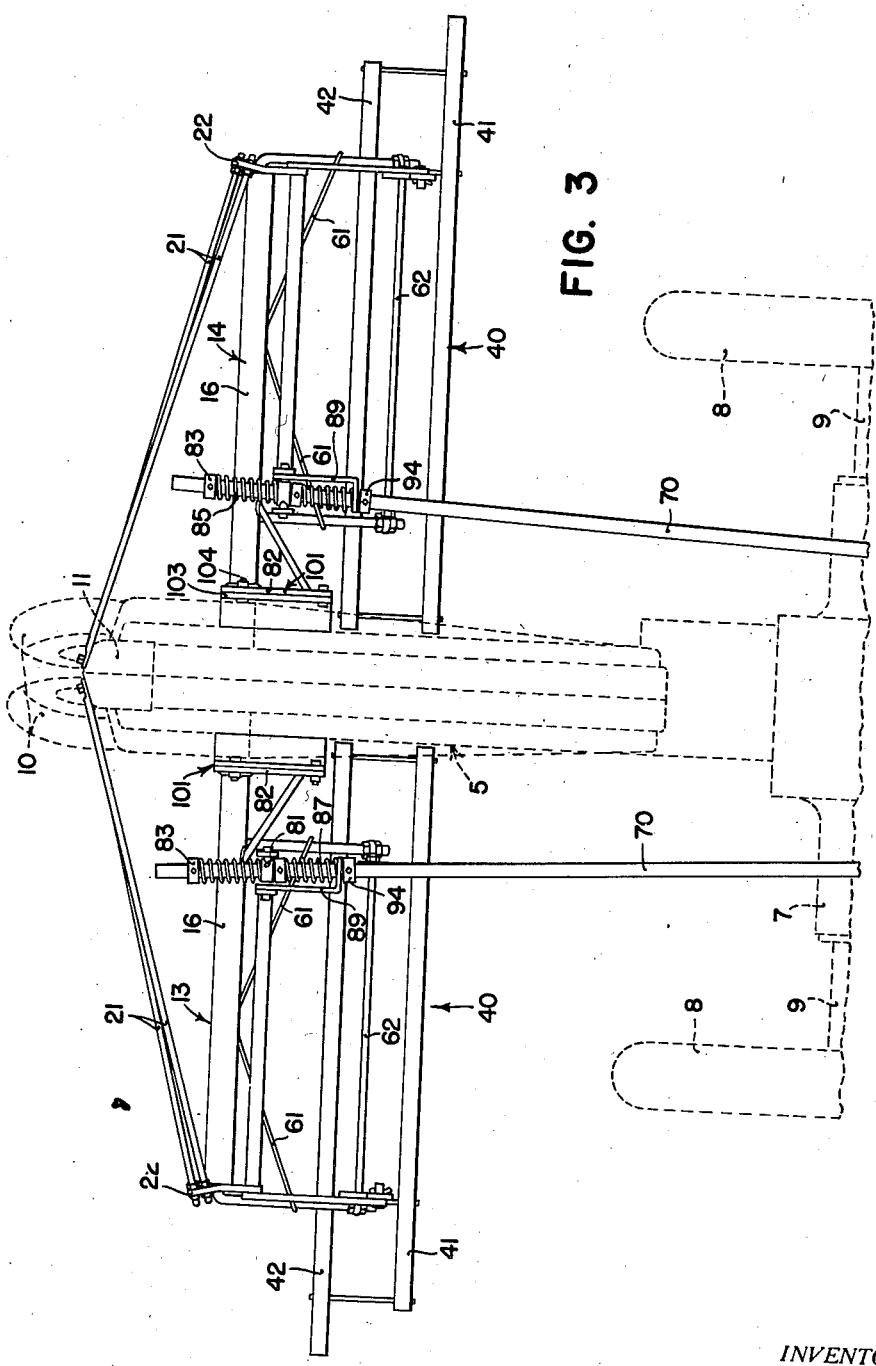
Figure 3 is a fragmentary plan view, similar to Figure 1, but showing the parts of the cultivator arranged so that the inner ends of the tool frames clear the sides of the tractor, thereby accommodating a higher lift than is practical where the cultivator tool frames are disposed underneath the tractor, as in Figure 1.

Referring now to Figure 1, it will be seen that when the tool frames 40 are arranged to overlap and to extend underneath the tractor, the tool frame bars 41 to 44 extend laterally inwardly from the inner lift bracket 37 much farther than they extend outwardly beyond the outer lift bracket 37. Also, on one tool frame the forward frame bars 42 and 44 extend laterally beyond the rear frame bars 41 and 43, so as to secure the desired overlap. It will also be noted that the distance which the frame bars extend outwardly from the outer lift bracket 37 is slightly smaller than the distance from the laterally inner lift bracket 37 to the side of the tractor. Therefore, if the right and left-hand tool frames 40 are reversed, or interchanged, and specifically, if the right-hand tool frame is detached from the associated arms 27, 29 and 50 and connected with the corresponding arms at the left side of the tractor, and the left-hand tool frame is moved over to the right side of the tractor and connected to the right-hand arms 27, 29 and 50, then the longer overlapping ends of the tool frames, which formerly were disposed underneath the tractor, will extend laterally outwardly of the outer lift brackets, and the shorter ends of the tool frame, which formerly were disposed laterally outwardly, will become the laterally inner ends of the tool frames and are sufficiently short so that the ends will clear the sides of the tractor and the tool frames may be arranged considerably higher than was possible in the first arrangement. Figure 3 illustrates the reversed relation. It will thus be seen that the draft brackets 22 and 24 are spaced laterally along the associated draft beam so as to make this reversal possible and to support the frames, whether in one position or the other, in exactly the relation desired. There the lift brackets 37 are not disposed in the center of the frames 40, it is necessary to secure the desired reversal of the tool frames by interchanging them. However, by disposing the lift brackets 37 in the center of the tool frames and arranging the pivots 36 and 49 at the necessary points, the tool frames 40 may be reversed end for end.

After the tool frames 40 have been reversed so as to accommodate a high lift, it may be desired to mount the draft members 13 and 14 somewhat higher and outwardly laterally farther than when they are bolted directly to the tractor side frames. In that event, according to the present invention, I provide a pair of high clearance brackets, the right-hand bracket being indicated in Figure 4 by the reference numeral 101. This bracket includes a lower section 102 having bolt-holes arranged to receive the bolts 19 which, in Figure 2, is used to secure the draft member 14 directly to the tractor frame. The upper portion of each high clearance bracket 101 is offset laterally outwardly and includes an attaching section 103 which is provided with bolt-holes corresponding to the positions of the bolt-holes in the attaching bracket 17 whereby bolts 104, or other suitable means, may be used for firmly securing the draft member 14 to the bracket 101 but in a higher position than the position the draft member 14 occupies when secured directly to the tractor, as in Figure 2. Obviously, the bolts 19 and 104 may be identical and may be supplanted by any other equivalent means, depending upon the particular type of attachment fastenings that it may be desired to use. When the tool frames 40 are reversed and the high clearance brackets 101 used, forward movement of the lift pipes 70 raises the tool frames 40 alongside the sides of the tractor, thus providing for raising and lowering the tools when cultivating crops grown on relatively high beds. Such an arrangement also will accommodate operating with the tool frames tilted, as mentioned above.

Figure 5 shows a modified form of the present invention in which the tool frame means is a single transversely disposed frame, rather than two aligned but separate frame sections, as in the forms of the invention described above. Referring now to Figure 5, the tool frame of this form of the invention is indicated by the reference numeral 120 and comprises transverse bars extending from one side of the tractor to the other, the bars being of substantially the same form shown in Figure 2 except that they are longer. The two upper bars 121 and 122 are flat strap-like members and the two lower bars 123 and 124 are T-bars. All of the bars are of the same length and are connected together by cross braces 125. Preferably, the cross bars 125 comprise two adjustably connected parts constructed in the manner disclosed in my prior patent mentioned above. The two center cross bars 125 have fixed thereto upstanding lift brackets 127 to the lower portion of which the rear ends of a bail 128 are pivoted. The bail 128 is supported by a pair of brackets 130 fixed to the tractor by bolts 131 or any other suitable means. Each of the brackets 130 includes an upstanding section 133 and an attaching section 134, the latter receiving the bolts 131. A stub shaft 136 is fixed to the bracket sections 133 and 134 and extends laterally outwardly of the section 133 a distance sufficient to receive a lifting bell crank 137. Each of the bell cranks 137, there being one at each side of the tractor, consists of a lifting arm 138 and an upwardly extending arm 139 to which a hammer strap 140 is connected. In this form of the invention a longitudinally shiftable lifting member 70a extends forwardly between the two parts of the lifting arm 138 and is supported therein by a collar 141 pivotally supported by trunnions in the upper end of the arm 138. The member 70a is slidable in the collar 141 and rearwardly of the latter carries a collar 142 which may be adjustably fixed to the lifting member 70a. The rear end of the latter is connected to the associated hand lever at the rear of the tractor, this construction being the same as described above in connection with Figure 1. That is, each of the two lifting members 70a is connected to its own hand lever, both being mounted on the rock shaft 76 and may be swung simultaneously by actuating the master lever 78 to raise and lower both ends of the tool frame 120 through the same distance. Actuating one of the hand levers 74 serve to act through its associated lifting bell crank 137 to raise or lower one end of the tool frame 120, the connections between the lifting bell cranks 137 and the tool frame being loose to accommodate this action. In the lifting operation, the members 70a are moved forwardly so that the associated collars 142 thereon engage the collar 141 at the upper end of the lifting arm 139, thereby swinging the lifting arms 137 upwardly. The collars 142 are adjustable to accommodate the height of lift desired. If desired, the collars 142 may be adjusted so that in the lowered position of the tool frame the lifting arms 139 come up against the collars 142, whereby the members 70a and the hand levers 74, being latched to the associated sectors on the master shaft 76, serve to limit the downward movement of the tool frame 120, whereby the tractor 1 serves to gauge the operating depth of the tools 98, 99. If desired, however, the collars 142 may be set back on the associated lifting members 70a and gauge wheels 150 connected, by any suitable means such as shanks 151, to the outer ends of the tool frame 120. This permits the tool frame to float and to be gauged from the ground surface at the outer ends of the tool frame, rather than by the wheels of the tractor.

According to the present invention, means is provided in this form whereby spring pressure is applied to the tool frame 120 to hold the tool frame 120 down into an operating position, which spring pressure means is also arranged to aid in lifting the tool frame and associated parts. Referring now more particularly to Figures 5 and 6, each of the lifting members 70a, back of the collar 142, carries a clamp 160 to which the rear end of the spring 161 is connected, as by a bolt 162. The forward end of the spring 161, which extends generally downwardly and forwardly from the associated clamp 160, is connected to a clamp 163 (Figure 6) which is adjustably fixed to the lifting arm 138 by a bolt 164. The clamp 160 may be adjusted along the lifting member 70a upon which it is mounted and/or the bolt 162 may be tightened or loosened to vary the tension in the spring 161, and the clamp 163, to which the forward end of the spring 161 is connected, may be adjusted generally vertically along the arm 138, it being noted that the position of the clamp 163 is between the pivotal connection of the pipe 70a to the upper end of the arm 138 and the pivot about which the lifting bell crank 137 is swingably mounted on the tractor. Each lifting member 70a is connected with the associated lifting bell crank 136 by a spring as just described, and hence the same reference numerals have been used for the connections at both sides of the tractor. A stop collar 167 is disposed on the forward end of each lifting member 70a, and the collars 167 may be fixed to the lifting members 70a in a position spaced forwardly of the pivoted collar 141, or substantially up against the same, the latter position being shown in dotted lines in Figures 5 and 6.

When the collars 167 are fixed to the associated lifting members 70a forwardly of the collars 141 in which the members 70a are slidable, the springs 161 serve two functions. When they are adjusted to exert a certain amount of tension when the tools are in their lowered position and the collars 141 are back against the stop collars 142 on the members 70a, the springs 161 resist upward movement of the tools and tool frame, for it will be seen from Figures 5 and 6, if the tool frame 120 moves upwardly the lifting bell crank arms 139 are shifted forwardly, which will stretch the springs 121, it being assumed that the hand levers 74 and 78 are latched in position so that the lifting members 70a are held against movement. On the other hand, whenever the levers 74, 78 are actuated to raise the tool frame, thrusting forwardly on the lifting members 70a to swing the lifting arms 138 upwardly, it will be seen that the clamps 160 move forwardly with the members 70a, shortening the distance between the clamps 160 and the associated clamps 163, whereby the tension stored in the springs 161 is effective to aid in raising the tool frame 120 and associated parts, but without interfering with the action of these springs in yieldingly holding the tool frame 120 down in a working position when the hand levers 74 and 78 are latched.

The closer the clamps 163 are adjusted to the stub shafts 136, the greater will be the effect of the springs 161 in aiding the lifting of the tool frame 120 and the smaller will be the effect of the springs 161 in holding the tool frame down in working position, therefore the feature of adjustability of the clamps 160 and 163 makes it possible to secure exactly the arrangement desired.

Figure 7:
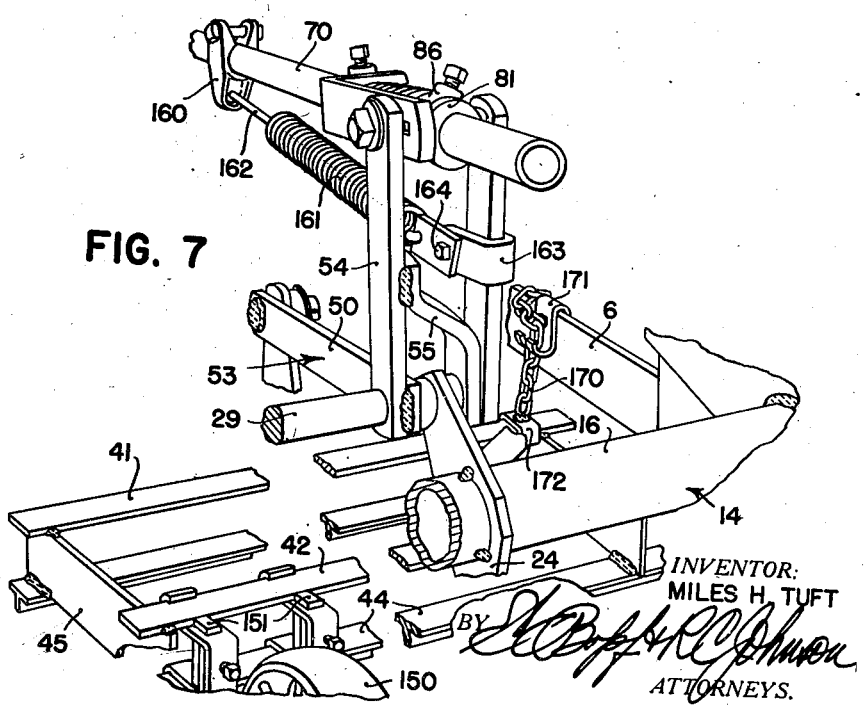
Figure 7 is a view similar to Figure 4 but with modified lifting connections.

In Figures 2 and 4 I have shown an arrangement in which the inner and outer ends of each tool frame section may move one relative to the other, and I have also shown the use of two springs arranged to apply yielding pressure to the respective ends of the tool frame section and arranged to accommodate one end moving relative to the other. Both springs, indicated by the reference numerals 85 and 87, are mounted directly on the associated lifting member 70, and hence neither spring can aid in raising the associated tool frame, as can the spring 161 shown in Figures 5 and 6. If desired, however, the spring 161, together with associated clamps 160 and 163, may be substituted for one of the compression springs 85 and 87 so as to secure the effect present in the form of the invention shown in Figures 5 and 6, namely, one spring serving both as means for holding the tool frame down in working position and also to aid in raising the tool frame. Such an arrangement is shown in Figure 7, in which the forward compression spring 85 at each side of the tractor is replaced by a spring 161. Otherwise, the parts shown in Figure 7 are the same as those shown in Figures 2 and 4, therefore the same reference numerals have been applied. Referring to Figure 7 it will be seen that the spring 161 at each side of the tractor is connected by its clamp 160 to the associated lifting pipe 70 and that the forward end of each spring the clamp 164 connects the spring adjustably to the lifting arm 87 which, it will be remembered, is connected through the rock shaft 29 with the arm 50 by which the outer end of the associated tool frame is raised and lowered. For the reasons explained above in connection with Figures 5 and 6, the spring 161 in Figure 7 is effective to exert yielding force against the outer end of the tool frame to force the same down into a working position, but in addition, the spring 161 is also effective to aid in raising the entire tool frame by virtue of the tension of the spring 161 being effective to shift the associated lifting pipe 70 forwardly. If desired, two springs 161 could be arranged at each side of the tractor, one for each of the lifting arms 54 and 57, but the form shown in Figure 7 is preferred.

Figure 5, as described above, shows an arrangement in which two gauge wheels 150 are connected with the outer ends of the transversely disposed tool frame 120, the gauge wheels 150 arranged to extend forwardly of the front bars so as to be, generally speaking, laterally outwardly of the front wheel 10 of the tractor. If desired, the gauge wheels 150 may be connected, one to the outer end of each of the tool frames 40 in either Figure 1 or Figure 7. In order to illustrate this arrangement I have shown the wheels 150 as connected with the outer ends of the tool frames in the implement shown in Figure 5, in which case the lifting connections may be arranged to permit the tool frames to float; in other words, the collars 86 and 94, with associated parts, are so adjusted that the lifting connections do not serve to limit the downward movement of the tool frames, the gauge wheels 150 serving as supporting means for the outer ends of the tool frames. In this arrangement, where separate tool frame sections are employed, it is necessary to support the inner ends of the tool frames as well as the outer ends. If desired, gauge wheels similar to the gauge wheels 150 may be connected with the inner ends of the tool frames 40, but preferably I connect a chain or other flexible element 170 between each tool frame and the adjacent part of the tractor. To this end, I provide a pair of clips 171 to receive the upper end of each of the chains 170, and a second clip 172 fastening the lower end of each chain to the laterally inner end of the associated tool frame. The effective length of each chain 170 may be adjusted by hooking one or the other of the links to the upper clip 171. By virtue of linking the inner ends of the tool frames 40 to the tractor frame, the front wheel 10 of the tractor becomes, in effect, the gauging means for the inner ends of the tool frames while the outer ends of the tool frames are gauged by the wheels 150. It is to be understood that, if desired, the construction shown in Figure 1 may be provided with similar gauging means, or that such gauging means may be eliminated entirely and reliance placed upon the tractor for holding the tool frames in proper operating position.

While I have shown and described above the preferred means in which the principles of the present invention have been incorporated, it is to be understood that my invention is not to be limited to the particular means shown and described above, but that, in fact, widely different means may be employed in the practice of the broader aspects of my invention.

What I claim, therefore, and desire to secure by Letters Patent is:

1. An agricultural implement comprising means serving as a supporting frame, an elongated tool frame disposed generally transversely of said supporting frame means, a pair of independent yielding means reacting against and both disposed adjacent one side of said supporting frame means, and means connecting one of said yielding means with the inner end portion of said transversely disposed tool frame and the other yielding means with the outer end portion of said transversely disposed tool frame for resiliently holding the same in position and accommodating changes therein whereby the tool frame may follow variations in the ground surface.

2. An agricultural implement comprising means serving as a supporting frame, an elongated tool frame disposed generally transversely of said supporting frame means, a pair of laterally spaced relatively movable parts, both mounted adjacent said supporting frame means, means including laterally outwardly extending means for operatively connecting said parts, respectively, with the laterally inner and outer end portions of said tool frame, and means engageable with said parts for controlling the position of both ends of said tool frame.

3. An agricultural implement comprising means serving as a supporting frame, an elongated tool frame disposed generally transversely of said supporting frame means, a pair of laterally spaced parts supported by and movable relative to said supporting frame means and to each other, means connecting said parts, respectively, with the end portions of said transversely disposed tool frame, lifting means having independent one-way connection with said parts and operative for shifting both of said parts in one direction for raising both end portions of the tool frame, means for fixing said shifting means to hold the same against movement in either direction relative to said supporting frame means, and two independent resilient means reacting against said shifting means and connected, respectively, to act through said parts for yieldingly urging the same for movement in the other direction so as to hold each end of said tool frame in operating position independently of the position of the other end.

4. A tractor-mounted implement comprising a tool frame disposed generally transversely of the tractor, a member longitudinally shiftable relative to the tractor, spring means connected with said longitudinally shiftable member and with laterally opposite end portions of said tool frame for yieldingly holding the same in position, and means for latching said longitudinally shiftable member against movement relative to the tractor in a direction to sustain the reaction of said spring means in holding both end portions of the tool frame in position.

5. A tractor-mounted implement comprising a pair of elongated tool frames adapted to be disposed in alignment generally transversely of the tractor, means movably supporting each of said tool frames on the tractor, said supporting means being arranged to accommodate reversal of the tool frames whereby, in one position, the tool frames are supported with their inner ends underneath the tractor and in another position with inner ends in a position outside the tractor, and raising and lowering means connected with the inner and outer ends of each of said tool frames and adjustable whereby, when said frames are in said one position the inner ends thereof are raised an amount less than the outer ends so as to prevent the inner ends from striking the tractor, said raising means being adjustable when the tool frames are in their reversed position to raise the inner end and outer end of each tool frame through substantially the same distance, the inner end of each frame clearing the tractor when the tool frames are raised.

6. An agricultural implement comprising means serving as a supporting frame, a laterally outwardly extending supporting member connected thereto, a tool frame disposed generally transversely of said supporting frame means, a pair of laterally spaced apart means connecting the laterally extending tool frame with said laterally extending supporting member, each of said last mentioned means comprising a part on the supporting member and a companion part on said tool frame, said parts being spaced on the supporting member and on said tool frame whereby the latter may be mounted in one position in which the laterally inner end of the tool frame is disposed underneath said supporting frame means and in another position in which the inner end of the tool frame is disposed laterally outwardly of the supporting frame means.

7. An agricultural machine comprising means serving as a supporting frame, a laterally outwardly disposed supporting bar at each side of the supporting frame, means adjustably fixing the inner end of each of said supporting bars to the supporting frame in optional vertical positions, a pair of elongated tool frames disposed generally transversely of the supporting frame means, a pair of laterally spaced lifting arms mounted on each of said supporting members laterally outwardly of the supporting frame means, a pair of laterally spaced lift plates fixed to each tool bar and operatively connected with the associated lifting arms, said lift plates being spaced on said tool frames whereby the latter may be mounted in two optional positions, one in which the tool frames extend laterally inwardly underneath the supporting frame means and the other in which the tool frames are reversed with the inner ends of the tool frames in their reversed position disposed laterally outwardly of the supporting frame means, whereby the tool frames may be raised to a position alongside the supporting frame means, and raising means operatively connected with each pair of lifting arms and including adjustable means whereby when the tool frames are arranged in their first position the laterally outer end portions may be raised higher than the inner end portions which underlie the supporting frame means, said adjusting means being adapted to be disposed in a position to raise the inner ends of the tool frames, when in their reversed position, alongside but laterally outwardly of the supporting frame means.

8. An agricultural implement as defined in claim 7, further characterized by the provision of spring means acting against said lifting arms for forcing the tool frames downwardly, the spring means acting against each arm being independent of the other spring means, and said lifting means being arranged to move said lifting arms only in a direction in which the tool frames are raised.

9. In a tractor mounted agricultural implement having a laterally extending supporting member, means adapted to secure said supporting member directly to the tractor, a detachable bracket adapted to be connected to the tractor in lieu of said supporting member, said bracket having means to receive said supporting member and said attaching means therefor, whereby the supporting member may be mounted on the tractor at a location different from its location when secured directly to the tractor.

10. In an agricultural implement, the combination of a tractor having bolt-receiving openings, a supporting member having an attaching plate at one end, detachable means adapted to connect said plate directly to the tractor and including parts disposable in said bolt openings, a detachable bracket, means detachably connecting the same to the tractor including parts disposable in said bolt openings, said bracket having bolt holes corresponding to the bolt holes in the tractor, and means for securing said supporting member to said bracket.

11. In an agricultural implement having a movable tool carrying frame, a pair of shiftable members connected with different portions of said tool frame and movable relative to each other, means for raising said frame including a shiftable part and a pair of separate stops thereon adapted, respectively, to engage said members, and a pair of spring means reacting against said shiftable part for normally holding said members against the associated stops on said shiftable part.

12. An agricultural implement as defined in claim 11, further characterized by said stops being adjustable whereby one part of the tool frame may be raised or lowered through a greater extent than the other part.

13. An agricultural implement as defined in claim 11, further characterized by means for adjusting the effective tension of said spring means.

14. An agricultural implement comprising means serving as a supporting frame, a transverse tool frame, a generally longitudinally extending lift member, a pair of lifting arms supported by said frame means adjacent said lifting member and connected, respectively, with the end portions of said tool frame, means on said longitudinally shiftable lifting member for swinging both of said lifting arms in one direction, and a pair of springs, each connected to react against said shiftable member for urging said lifting arms to move in the other direction, at least one of said springs being supported on said longitudinally shiftable member.

15. In an agricultural implement having generally transversely disposed means to be raised and lowered, a pair of movably mounted parts connected, respectively, with opposite portions on said first mentioned means, a longitudinally shiftable lifting member, means connected with each of said parts and embracing said longitudinally shiftable member, adjustable stops on said member and engageable with said last mentioned means, whereby movement of said shiftable member acts through said parts for raising and lowering said first mentioned means, adjustment of said last mentioned means on said shiftable member determining the raised position of said first means, and spring means embracing said shiftable member and reacting against the latter for shifting said parts relative to said shiftable member, thereby resiliently holding said first mentioned means in position.

16. In an agricultural implement having a rockably mounted lever, a member shiftable in one direction relative to said lever, and a spring, adjustable means fixing one end of said spring to said lever, and adjustable means fixing the other end of said spring to said longitudinally shiftable member, adjustment of said first adjustable means around said lever serving to adjust the effectiveness of said spring and adjustment of the other adjustable means serving to determine the tension exerted by said spring.

17. An agricultural implement comprising means serving as a supporting frame, an elongated tool frame disposed generally transversely of said supporting frame means, laterally extending tool supporting means connected at its inner end with said supporting frame, means serving as a bell crank swingably mounted on said tool supporting means adjacent the inner end of the latter and connected with the laterally inner end of said tool frame, means serving as a second bell crank means swingably mounted on said tool supporting means and including a transverse rock shaft and a part thereon operatively connected with the laterally outer portion of said tool frame, and raising and lowering means connected, respectively, with said first bell crank means and with the second bell crank means at the laterally inner end of said rock shaft.

18. A tractor-mounted implement comprising a pair of elongated tool frames adapted to be disposed in alignment generally transversely of the tractor, means movably supporting each of said tool frames on the tractor, said supporting means being arranged to accommodate reversal of the tool frames whereby, in one position, the tool frames are supported with their inner ends underneath the tractor and in another position with inner ends in a position outside the tractor, and raising and lowering means connected with said supporting means in either position of said tool frames.

19. A tractor mounted implement comprising an elongated tool frame disposed generally transversely of the tractor, and pairs of cooperating supporting means on the tractor and said tool frame, the supporting means on the tool frame being spaced farther from one end of the tool frame than the other and said supporting means being arranged to accommodate reversal of the tool frame whereby, in one position, the tool frame is supported with its inner end underneath the tractor and in another position with its inner end in a position outside the tractor.

20. In an agricultural implement having a movable tool carrying frame, a pair of shiftable members connected with different portions of said tool frame and movable relative to each other, means for raising said frame including a shiftable part and a pair of separate stops thereon adapted, respectively, to engage said members, and biased means reacting against said shiftable part for normally holding said members against the associated stops on said shiftable part.

21. An agricultural implement comprising means serving as a supporting frame, a transverse tool frame, a generally longitudinally extending lift member, and a pair of lifting arms supported by said frame means adjacent said lifting member and connected, respectively, with the inner and outer end portions of said tool frame.

22. An agricultural implement comprising means serving as a supporting frame, a transverse tool frame, a generally longitudinally extending lift member, a pair of lifting arms supported by said frame means adjacent said lifting member and connected, respectively, with the end portions of said tool frame, and means on said longitudinally shiftable lifting member engageable with said lifting arms for swinging both in one direction.

23. A tractor-propelled implement comprising a pair of elongated tool frames adapted to be disposed generally transversely of the tractor, means floatingly connecting each of said tool frames with the tractor, ground engaging gauge means at the laterally outer end of each tool frame, and means connecting the laterally inner end of each tool frame with the tractor whereby the latter serves as gauging means for the laterally inner ends of said tool frames.

24. A tractor-propelled implement comprising a pair of elongated tool frames adapted to be disposed in alignment generally transversely of the tractor adjacent the forward portion thereof, said tractor being of the tricycle type having relatively narrow front wheel means at the front end of the tractor, means floatingly connecting the tool frames with the tractor, ground engaging gauge means at the laterally outer end of each tool frame, and means for limiting the downward movement of the laterally inner end of each tool frame relative to the tractor, whereby the inner portions of the tool frames are gauged principally by said relatively narrow front wheel means of the tractor.

25. An agricultural implement comprising means serving as a supporting frame, elongated tool means disposed generally transversely of the supporting means, a laterally extending draft bar secured to said supporting frame means, a rock shaft mounted for rocking movement thereon and extending generally laterally, an arm fixed to the outer end of said rock shaft and connected with the outer end portion of said tool means, means serving as a bell crank mounted for rocking movement at the inner end of said rock shaft, and means connected with the inner end of said rock shaft and with said bell crank for raising and lowering both the inner and outer ends of said tool means.

26. An agricultural implement comprising means serving as a supporting frame, elongated tool means disposed generally transversely of the supporting means, a laterally extending draft bar secured to said supporting frame means, a rock shaft mounted for rocking movement thereon and extending generally laterally, an arm fixed to the outer end of said rock shaft and connected with the outer end portion of said tool means, means serving as a bell crank mounted for rocking movement at the inner end of said rock shaft, an arm fixed to the laterally inner end of said rock shaft and disposed adjacent said bell crank, and operating means having independent connection with said inner arm and said bell crank for raising and lowering both the laterally inner end portion and the laterally outer end portion of said transverse tool means.

27. A tractor mounted implement comprising a pair of transversely disposed tool frames extending generally in alignment transversely of the tractor, a pair of transversely disposed tool supporting members to which said tool frames are connected for generally vertical movement, and a pair of brackets, one at each side of the tractor and secured thereto, each of said brackets including a laterally outwardly disposed section to which the inner ends of said tool supporting members are fixed, whereby the laterally inner ends of said tool frames are spaced apart a distance sufficient to clear the sides of the tractor when the tool frames are raised.

28. In an agricultural implement having a supporting member adapted to be attached to a tractor in different lateral positions thereon and in which the supporting member is adapted to be attached to the tractor by fastening means extending through one or more openings in the tractor frame and the inner portion of the supporting member, an adapter bracket for connecting the supporting member to the tractor, said adapter bracket having two laterally spaced sections, each section having one or more openings therein to receive said fastening means, the openings in one bracket section corresponding to the openings in the other section.

29. In an agricultural implement having a supporting member adapted to be attached to a tractor in different lateral positions thereon and in which the supporting member is adapted to be attached to the tractor by fastening means extending through one or more openings in the tractor frame and the inner portion of the supporting member, an adapter bracket for connecting the supporting member to the tractor, said adapter bracket having two vertically spaced sections, each section having one or more openings therein to receive said fastening means, the openings in one bracket section corresponding to the openings in the other section.

30. In an agricultural implement, means serving as a supporting frame, a laterally outwardly extending tool supporting member connected at its inner end with said supporting means, a generally transversely disposed tool means connected with said supporting member for movement relative thereto, a pair of laterally spaced brackets fixed to said supporting member, means including a rock shaft carried by said brackets for shifting said tool means, one of said brackets being connected adjacent the laterally outer end of said supporting member, and having a laterally outer bent section provided with a pair of apertures therein, a pair of brace rods disposed in said apertures and extending from said laterally outer bracket to said supporting means.

31. In a tractor mounted implement, a supporting structure, tool carrying frame means movable generally vertically relative thereto and comprising two aligned frame sections, and means for moving said sections vertically relative to said supporting structure and including means accommodating reversing each frame section end for end.

32. In a tractor mounted implement, a supporting strutcure, tool carrying frame means movable generally vertically relative thereto and comprising two aligned frame sections, two pairs of relatively movable parts rockably supported on said structure, one pair being connected, respectively, with the opposite end portions of one of said frame sections and the other pair being connected, respectively, with the other pair, means acting through said parts for raising both of said frame sections at substantially the same time, and spring means acting independently through said parts for individually restraining upward movement of each end of each frame section.

33. In an agricultural implement having tool means to be raised and lowered, a rockably mounted lever operatively connected with said tool means, and a member pivotally connected with said lever for moving the same in one direction, said lever being movable relative to said member in said one direction, a spring extending between said lever and said member, means connecting one end of said spring to said member, and means capable of adjustment relative to said lever toward or away from the point where said member is connected therewith, adjustment of said last-mentioned means serving to vary the ratio between the component of force of said spring effective to resist movement of said lever relative to said member in said one direction and the component of said force effective to aid in the movement of said lever by movement of said member in said one direction.

34. In an agricultural implement having tool means to be raised and lowered, a rockably mounted lever operatively connected with said tool means, and a member pivotally connected with said lever for moving the same in one direction, said lever being movable relative to said member in said one direction, a spring extending between said lever and said member, means connecting one end of said spring to said lever spaced from the point where said member is connected therewith, whereby there is a component of the force of said spring effective to resist movement of said lever relative to said member in said one direction and a component of said force effective to aid in the movement of said lever by movement of said member in said one direction, and means capable of adjustment longitudinally of said member generally toward and away from said point so as to increase or decrease both of said force components.

35. In an agricultural implement having a movable tool carrying frame, a pair of shiftable members connected with different portions of said tool frame and movable relative to each other, and means for raising said frame including a shiftable part and a pair of separate stops thereon adapted, respectively, to engage said members.

36. In an agricultural implement having a movable tool carrying frame, a pair of upstanding arms connected with different portions of said tool frame and movable relative to each other, and means for raising said frame including a shiftable part, means slidably supporting said shiftable part on the upper ends of said arms and a pair of separate stops on said shiftable part and adapted to engage, respectively, said supporting means whereby movement of said shiftable part in one direction swings said arm and raises said tool frame.

37. In an agricultural implement having a movable tool carrying frame, a pair of upstanding arms connected with different portions of said tool frame and movable relative to each other, means for raising said frame including a shiftable part, means slidably supporting said shiftable part on the upper ends of said arms and a pair of separate stops on said shiftable part and adapted to engage, respectively, said supporting means whereby movement of said shiftable part in one direction swings said arm and raises said tool frame, and biased means for holding said supporting means against the associated stops on said shiftable part.

38. A tractor-mounted implement comprising transverse tool frame means, a bell crank lifting lever pivotally mounted on the tractor and connected at one end to raise said tool frame means, a longitudinally disposed lifting member shiftably connected with the other end of said bell crank lever, a stop on said longitudinal member engageable with said other end of the bell crank lever, whereby longitudinal shifting movement of said member acts through said bell crank lever to raise said tool frame means, a spring adjustably connected at its rear end to said longitudinally shiftable member and adjustably connected at its forward end to said bell crank between said longitudinally shiftable member and the axis of swinging of the bell crank lever, whereby rearward movement of said member acts through said spring and said bell crank lever to lower said tool frame means, said spring means resisting swinging movement of the bell crank lever due to the upward movement of said tool frame means when said longitudinally shiftable member is in a rearward position, means connected between the inner portion of said tool frame means and the tractor for limiting the downward movement of the tool frame means, and gauging means at the outer ends of said tool frame means.

MILES H. TUFT.